United States Patent [19]

Ort

[11] 4,116,075
[45] Sep. 26, 1978

[54] MECHANICAL TO ELECTRICAL TRANSDUCER

[75] Inventor: Werner Ort, Darmstadt, Fed. Rep. of Germany

[73] Assignee: Hottinger Baldwin Messtechnik GmbH, Darmstadt, Fed. Rep. of Germany

[21] Appl. No.: 767,124

[22] Filed: Feb. 9, 1977

[30] Foreign Application Priority Data

Mar. 1, 1976 [DE] Fed. Rep. of Germany ....... 2608381

[51] Int. Cl.² .............................................. G01L 9/04
[52] U.S. Cl. ........................................ 73/708; 73/726; 338/4
[58] Field of Search ................... 73/88.5 R, 88.5 SD, 73/398 AR, 708, 726; 338/2, 3, 4

[56] References Cited

U.S. PATENT DOCUMENTS

| | | | |
|---|---|---|---|
| 2,921,471 | 1/1960 | Weber et al. | 73/398 AR |
| 3,498,118 | 3/1970 | Ruge | 73/88.5 R |
| 3,744,317 | 7/1973 | Hessinger | 73/398 AR |

Primary Examiner—Charles A. Ruehl
Attorney, Agent, or Firm—W. G. Fasse; W. W. Roberts

[57] ABSTRACT

In a mechanical to electrical transducer, a plurality of strain gauges are mounted either on a diaphragm or on a flexure spring mechanically coupled to the diaphragm. The diaphragm is mounted on a clamping ring, and the strain gauges are disposed at different distances from the clamping ring. In order to equalize the heat transfer of the strain gauges with respect to the clamping ring, the areas of the strain gauges may be varied, the spacings of the conductors of the strain gauges may be varied, the relative positioning of the strain gauges may be controlled, the width of various portions of the flexure spring may be varied, or slots may be provided adjacent certain strain gauges in the flexure spring.

18 Claims, 9 Drawing Figures

MECHANICAL TO ELECTRICAL TRANSDUCER

BACKGROUND OF THE INVENTION

The invention relates to a transducer comprising a diaphragm on which the mechanical quantity to be measured acts. The deformation of the diaphragm is being converted to an electric signal by means of strain gauges. The membrane or diaphragm is mounted to a reinforced clamping rim. The strain gauges are attached to the outside of the diaphragm or to a flexure spring connected to the diaphragm.

Such transducers comprise, for instance, a diaphragm, to which strain gauges are directly secured which respond to an appropriately strong action of the mechanical quantity to transform the respective change of the deflection of the diaphragm into an electric resistance change. Pressure transducers, for instance, convert a pressure in a gaseous or liquid medium into a resistance change in the strain gauges. For this purpose such pressure transducers are provided with a diaphragm or with a spring plate which is customarily equipped directly with thin-film strain gauge strips to respond to rated pressures of 10 bar or more. Four strain gauge strips are generally connected to form a full bridge circuit, with two opposite strain gauges of the bridge being stressed in one sense by the deformation of the diaphragm, for instance, in compression, and being located closer to the clamped rim of the diaphragm than the other two oppositely stressed, for instance, tension strain gauges, which are arranged in the center of the diaphragm, or at any rate, farther away from the clamping rim of the diaphragm than the first-mentioned strain gauges. The arrangement and mode of operation of such transducers is independent of the mechanical quantity. Stated differently, it does not matter whether the quantity to be ascertained is a force, or a pressure or an acceleration or a moment or torque. However, where pressures are to be ascertained the transducer would be provided with a diaphragm having a reinforced center.

If the mechanical quantities acting on the transducer are small, the device carrying the strain gauges, in the present case, a diaphragm or a flexure spring, must of necessity also be made thinner as the acting quantity decreases. Here, also two of the four strain gauge strips connected to form a full bridge circuit, are arranged closer to the rim than the other two.

If a supply voltage is applied, heat or Joule heat is generated in the strain gauges. With the usual supply voltage of 10 V and the usual strain gauge resistance of 350 ohms, the generated heat may be sufficiently large so that temperature differences may occur in the diaphragms due to the relatively poor heat conduction of the materials used for such diaphragms, for instance, alloy steels. The diaphragms are heated by the strain gauges and the heat generated in this manner is conducted through the diaphragm to the clamping rim. The strain gauge strips, which are arranged at different distances from the clamping rim, assume different temperatures because, although the same amount of heat is generated in each strain gauge strip, the heat transfer from the strain gauge to the clamping rim is different. Such different temperature of the strain gauge strips leads to different resistance changes of the strain gauge strips due to the thermal coefficient of the electric resistance. Depending on the manner in which the strain gauge strips are connected to form a full bridge circuit, these resistance changes are cummulative and lead to a bridge unbalance.

A temperature equilibrium is reached in the diaphragm only relatively slowly. The transducers then exhibit a zero drift or zero variation upon switching-on which, for instance, with a 10 V supply voltage, may continue for several minutes. This can result in measuring errors of the order of, for instance, 5% of the nominal value. If the thermal coefficient of the electric resistance depends, in addition on the temperature, then the temperature response of the null or zero point will also depend on the supply voltage.

The same difficulties are encountered if strain gauges are attached to a flexure spring coupled to a diaphragm. Here again, two strain gauge strips of a full bridge circuit must be arranged closer to the clamping rim, where the heat conduction is better, while two strain gauge strips are located farther away from the clamping rim, at a point where the heat transfer to the rim is lower.

OBJECTS OF THE INVENTION

In view of the above, it is the aim of the invention to achieve the following objects singly or in combination:

to remove the above drawbacks of the prior art, more specifically, to provide a transducer of the above type wherein all strain gauge strips always assume the same temperature, independently of the position of the respective strain gauge relative to the clamping ring;

to provide for a uniform heat dissipation throughout a transducer;

to provide a transducer with such a heat conductivity that a compensation for any non-uniform heat-up is assured; and to provide a heat compensation for transducers which may be applied with equally good results regardless whether the transducer is used for sensing forces, pressures, torques, or accelerations.

SUMMARY OF THE INVENTION

According to the invention, there is provided a transducer wherein different heat transfer characteristics are equalized, for example, by providing different surface dimensions for the strain gauge strips. According to the invention, the strain gauge strips located closer to the edge of the diaphragm have smaller surface dimensions than those located farther away.

Continuing the idea of the invention, a change of the heat transfer or heat conduction resistance of the strain gauge strips located in the zone of better thermal conduction can be achieved also by providing the strain gauge strips applied closer to the rim with a denser, meander-shaped sensing raster than the strain gauge strips which are farther removed from the clamped edge. In a further embodiment of the invention, two strain gauge strips mounted closer to the clamped edge are located side by side, while these arranged further away from the clamped edge are more spaced apart from each other. In the case of the strain gauge strips located closer to the clamped edge, the heating zones overlap, to provide the desired temperature equalization.

In another embodiment of the invention, the transducer has a flexure spring upon which the strain gauges are mounted. The flexure spring comprises several legs which connect a center piece to the clamping rim. The legs carrying the strain gauge strips arranged closer to the clamping rim are narrower or thinner than the legs which carry the strain gauge strips farther away from the clamping rim. By this feature, the thermal conduction resistance or heat transfer characteristics are equalized in a transducer with flexure springs substantially in the same manner as in a transducer with a diaphragm.

In still another embodiment of the invention, slots are provided in the flexure spring laterally adjacent the strain gauge strips which are arranged closer to the clamping rim. By this arrangement of slots according to the invention, an equalization of the heat transfer characteristics is likewise achieved.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
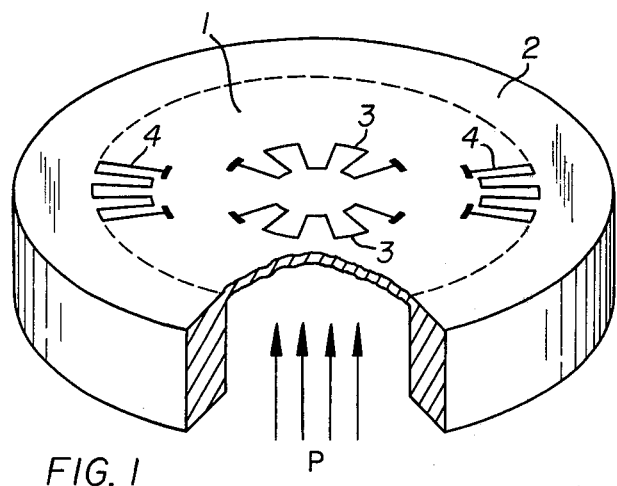
FIG. 1 is a perspective, partly sectional view of a diaphragm or a transducer, with the strain gauge strips arranged directly on the diaphragm.

The diaphragm 1 shown in FIG. 1 is mounted on a reinforced clamping rim 2, and carries pairs of strain gauge strips 3 and 4 which are stressed in opposite directions when the diaphragm 1 is deformed, for instance, by the pressure "p" to be measured. The strain gauge strips 3 located closer to the center of the diaphragm are stretched, while the strain gauge strips 4 located closer to the clamping rim 2 are compressed.

Figure 1A:
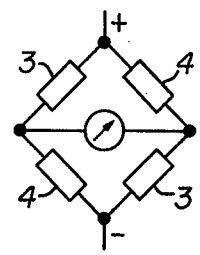
FIG. 1a is a circuit diagram of the full bridge connected together from the strain gauge strips.

It will be seen from the circuit diagram of FIG. 1a that the strain gauge strips stressed in the same direction are always connected diametrically opposite in the full bridge. The individual conductors of the strain gauge strips 3, conducted in meander-fashion, are at a greater distance from each other than the conductors of the likewise meander-shaped strain gauge strips 4.

Figure 2:
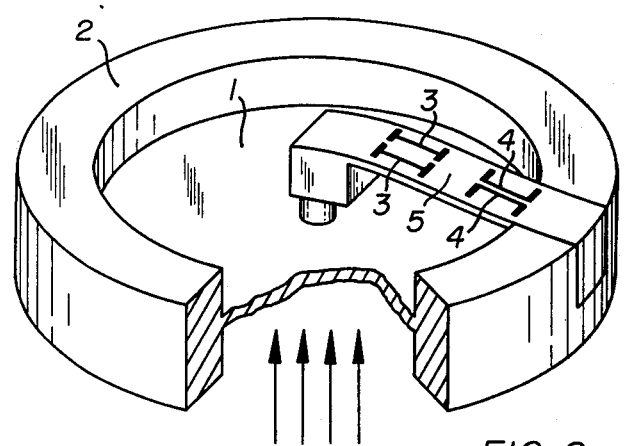
FIG. 2 is a perspective, partly sectional view of a diaphragm in a transducer for relatively low pressures, wherein the strain gauge strips are attached to a flexure spring connected to the diaphragm.

The embodiment example shown in FIG. 2 differs from the example of FIG. 1 in that the pairs of strain gauge strips 3 and 4 are attached to a flexure spring 6 having one end connected to the clamping rim 2 and the other end engaging the center of the diaphragm 1. The strain gauge strips 3 and 4 are also interconnected in a full bridge circuit as shown in FIG. 1a. In the strain gauge strips 4, located closer to the clamping rim 2, the conductors (not shown) are closer together than the conductors of the strain gauge strips 3, which are farther away from the clamping rim 2. Pressure transducers of the type shown in simplified form of FIG. 2 are customarily used for low rated pressures, e.g., below 10 bar, while pressure transducers of the type illustrated in FIG. 1 are predominantly used for higher pressure ratings.

If a force or an acceleration acts on the transducer, according to FIG. 1 or FIG. 2, the action of the force or the acceleration effect is transmitted to the diaphragm 1 or to the flexure spring 5.

Figure 3:
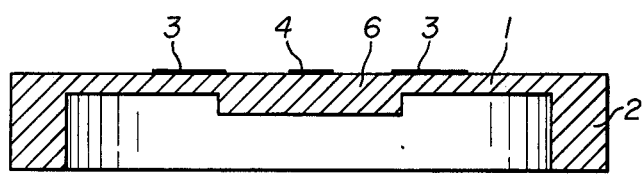
FIG. 3 is a cross sectional view of a diaphragm with a reinforced central part.
Figure 4:
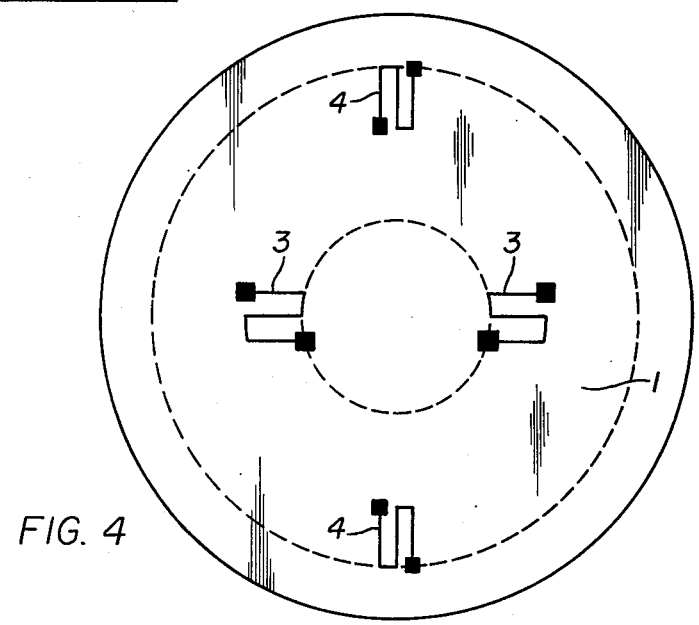
FIG. 4 is a top view of a diaphragm according to FIG. 3.
Figure 5:
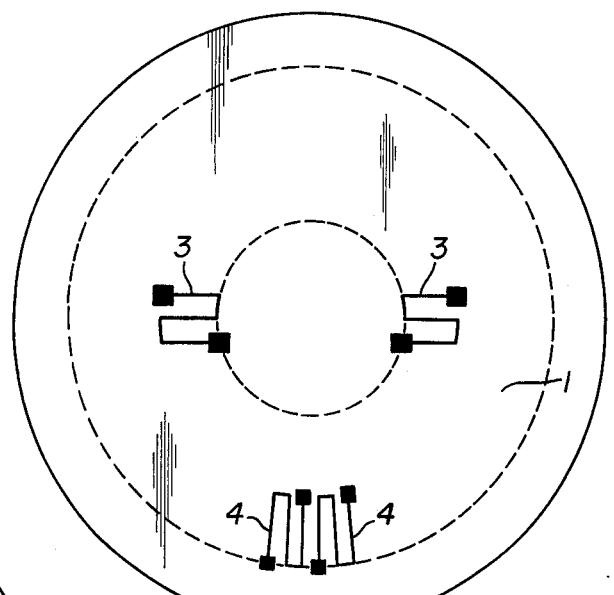
FIG. 5 is a view similar to that of FIG. 4, with a modified arrangement of the strain gauge strips.

When the diaphragm has a reinforced central part 6, as shown in FIGS. 3 to 5, the difference of the distances from the strain gauge strips 3 and 4 to the clamping rim 2 is smaller, but the different heat transfer is still undesirable. For this reason, the conductor spacings are chosen to be larger also here for the more inwardly located strain gauge strips 3 than for the outwardly located straing gauge strips 4, in order to obtain the same heat transfer characteristics to the rim. In the example shown in FIG. 5, this effect is further enhanced by arranging the outwardly located strain gauge strips 4 so close together that their heating zones overlap.

Even if, in the transducer design shown in principle in FIG. 2, the flexure spring 5 is clamped at both of its ends to the clamping rim 2, a different heat transfer characteristic of the strain gauge strips 3 and 4 results. This may be compensated by different conductor spacings, in order to obtain the same temperature for all strain gauge strips connected in a full bridge. In the example shown in FIG. 6, the flexure spring 5 is cut out of a spring plate by narrow slots 7, for instance, by etching, and the remaining areas 8 of the spring plate can be used for accommodating balancing resistors (not shown). The center of the flexure spring 5 is connected to the center of the diaphragm (not shown here). Next to the strain gauge strips 4 located close to the clamping rim 2, small slots 9 are provided in the flexure spring 5 in the example as per FIG. 6.

Figure 6:
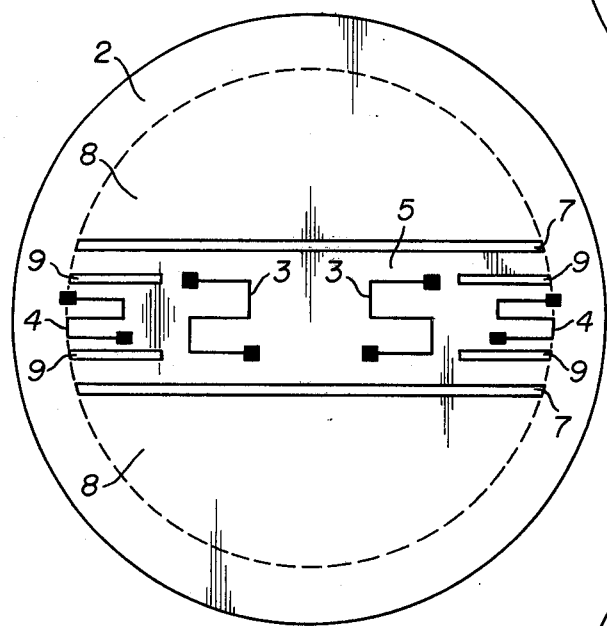
FIG. 6 is a top view of a modification of the transducer, wherein the flexure spring is cut out of a spring plate.
Figure 7:
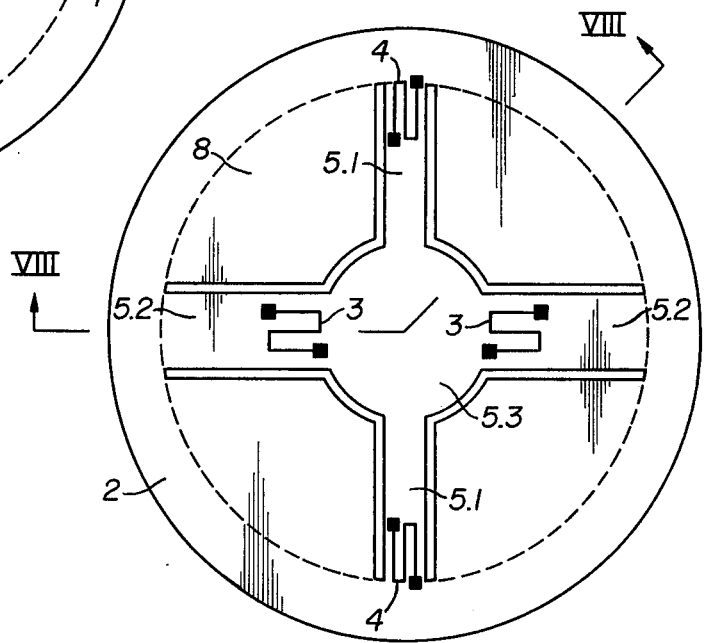
FIG. 7 is a top view of a modification of the transducer of FIG. 6, wherein the flexure spring is cut out of a spring plate and has mounted thereon four spring legs and a reinforced central part with strain gauge strips.

The embodiment of the invention shown in FIG. 7 differs from the example of FIG. 6 in that the flexure spring has two pairs of legs 5.1 and 5.2, which connect a center piece 5.3 to the clamping rim 2. The spring legs 5.1, which carry the strain gauge strips 4 arranged closer to the clamping rim 4, are narrower than the two legs 5.2 which carry the strain gauge strips 3, which are arranged farther away from the clamping rim 2. Thereby, an improvement of the heat transfer characteristics to the rim is obtained for the strain gauge strips 3. This improvement can be large enough that both pairs of strain gauge strips 3 and 4 are also held at the same temperature. However, it is also possible as shown in the example in FIG. 7, to additionally make the outwardly located strain gauge strips 4 likewise with a smaller conductor spacing than the inwardly located strain gauge strips 3, so that the compensation of the different heat transfer characteristics is brought about in part by the leg width or thickness and in part by the conductor spacing.

In the illustrated embodiment of the invention, thin-film strain gauge strips are preferably used, but the measures explained can likewise be effected when using other forms of strain gauge strips.

Figure 8:
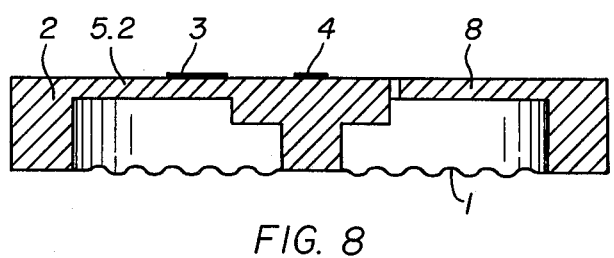
FIG. 8 is a cross section along the line VIII—VIII of FIG. 7.

In the embodiments of the flexure spring shown in FIGS. 6 to 8, the advantage is obtained that they can be manufactured more simply than the conventional flexure springs and that they already form a unit with the clamping rim 2. Welding into a slot, which must be pre-machined with great accuracy, is eliminated; there are no welded seams which impede the heat flow from the straing gauge strips attached to the flexure spring. In addition, resistor networks, for instance, etched from metal foil, can be cemented on the remaining edge segments 8 for the various balancing measures required. The compensation resistors for the temperature response of the null point then have generally the same temperature as the strain gauge strips.

Although the invention has been described with reference to specific example embodiments, it is to be understood that it is intended to cover all modifications and equivalents within the scope of the appended claims.

What is claimed is:

1. In a transducer for converting a mechanical movement of a diaphragm to an electric signal, wherein the diaphragm is mounted on a reinforced clamping rim and a plurality of strain gauges are mounted to be stressed in response to movement of said diaphragm, said strain gauges being thermally coupled to said rim and being mounted at different distances from said rim, the improvement wherein the heat transfer characteristics of said transducer between said rim and each of said strain gauges are the same, and wherein strain gauges located at different distances from said rim have different surface dimensions, to achieve the same heat transfer characteristics.

2. The transducer of claim 1, in which said strain gauges are mounted directly on said diaphragm.

3. The transducer of claim 1, wherein said strain gauges are mounted directly on said diaphragm, said strain gauges are formed of meandering conductors, and wherein the meandering conductors of the strain gauges closer to said rim have closer spacings from each other than the conductors of strain gauges further away from said rim, to achieve said same heat transfer characteristic.

4. The transducer of claim 1, wherein said strain gauges are mounted directly on said diaphragm, and a first pair of strain gauges is located closer to said rim than a second pair of strain gauges, and wherein the strain gauges of said first pair are located closer to one another than the strain gauges of said second pair, whereby the heating zones of said strain gauges located closer to said rim overlap.

5. The transducer of claim 1, further comprising a flexure spring extending from said rim and contacting said diaphragm, said strain gauges being mounted on said flexure spring.

6. The transducer of claim 1, further comprising a flexure spring extending from said rim and contacting said diaphragm, wherein said strain gauges are mounted on said flexure spring, said strain gauges comprising meandering conductors, with the conductors of strain gauges closer to said rim being closer together than the conductors of strain gauges farther from said rim.

7. The transducer of claim 1, further comprising a flexure spring extending from said rim and contacting said diaphragm, said strain gauges being mounted on said flexure spring, said flexure spring having a plurality of legs of different widths, with the strain gauges closer to said rim being mounted on the narrower of said legs.

8. The transducer of claim 7, wherein said strain gauges are formed of meandering conductors, the conductors of strain gauges mounted closer to said rim being closer together than the conductors of strain gauges further from said rim.

9. The transducer of claim 1, further comprising a flexure spring extending from said rim and contacting said diaphragm, said strain gauges being mounted on said flexure spring, said flexure spring having slots laterally adjacent the strain gauges mounted thereon which are closer to said rim than other strain gauges.

10. The transducer of claim 1, comprising four strain gauges mounted to be stressed in response to movement of said diaphragm, said strain gauges being electrically interconnected to form a full bridge circuit, with said first pair of opposite strain gauges to said bridge circuit being mounted closer to said rim than the other opposite strain gauges of said bridge circuit.

11. In a transducer for converting a mechanical movement of a diaphragm to an electrical signal, wherein the diaphragm is mounted on a reinforced clamping rim and a plurality of strain gauges are mounted to be stressed in response to movement of said diaphragm, said strain gauges being thermally coupled to said rim and being mounted at different distances from said rim, the improvement wherein said heat transfer characteristics of said transducer between said rim and each of said strain gauges are the same, said strain gauges being formed of meandering conductors, and wherein the meandering conductors of the strain gauges closer to said rim have closer spacings from each other than the conductors of strain gauges further away from said rim, to achieve said same heat transfer characteristic.

12. The transducer of claim 11, wherein said strain gauges are mounted directly on said diaphragm.

13. The transducer of claim 11, wherein said strain gauges are mounted directly on said diaphragm, and a first pair of strain gauges is located closer to said rim than a second pair of strain gauges and wherein the strain gauges of said first pair are located closer to one another than the strain gauges of said second pair, whereby the heating zones of said strain gauges located closer to said rim overlap.

14. The transducer of claim 11, further comprising a flexure spring extending from said rim and contacting said diaphragm, said strain gauges being mounted on said flexure spring, with strain gauges at different distances from said rim having different surface dimensions.

15. The transducer of claim 11, further comprising a flexure spring extending from said rim and contacting said diaphragm, wherein said strain gauges are mounted on said flexure spring.

16. The transducer of claim 11, further comprising a flexure spring extending from said rim and contacting said diaphragm, said strain gauges being mounted on said flexure spring, said flexure spring having a plurality of legs of different widths, and wherein the strain gauges closer to said rim are mounted on the narrower of said legs.

17. The transducer of claim 11, further comprising a flexure spring extending from said rim and contacting said diaphragm, said strain gauges being mounted on said flexure spring, said flexure spring having slots laterally adjacent the strain gauges mounted thereon which are closer to said rim than other strain gauges.

18. The transducer of claim 11, comprising four strain gauges mounted to be stressed in response to movement of said diaphragm, said strain gauges being electrically interconnected to form a full bridge circuit, and wherein two opposite strain gauges of said bridge circuit are mounted closer to said rim than the other two opposite strain gauges of said bridge circuit.

* * * * *